United States Patent
Guichard et al.

(10) Patent No.: US 7,373,660 B1
(45) Date of Patent: May 13, 2008

(54) METHODS AND APPARATUS TO DISTRIBUTE POLICY INFORMATION

(75) Inventors: James N. Guichard, Groton, MA (US); Daniel C. Tappan, Boxborough, MA (US); Robert Hanzl, Nashua, NH (US); W. Scott Wainner, Potomac Falls, VA (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 10/649,755

(22) Filed: Aug. 26, 2003

(51) Int. Cl.
*G06F 17/00* (2006.01)
(52) U.S. Cl. ..................................................... 726/15
(58) Field of Classification Search ................ 726/15, 726/2, 12; 713/153, 160
See application file for complete search history.

(56) References Cited

U.S. PATENT DOCUMENTS

| | | | | |
|---|---|---|---|---|
| 6,157,955 | A | 12/2000 | Narad et al. | 709/228 |
| 6,205,488 | B1* | 3/2001 | Casey et al. | 709/238 |
| 6,332,163 | B1 | 12/2001 | Bowman-Amuah | 709/231 |
| 6,539,483 | B1 | 3/2003 | Harrison et al. | 713/201 |
| 6,606,660 | B1 | 8/2003 | Bowman-Amuah | 709/227 |
| 6,631,416 | B2 | 10/2003 | Bendinelli et al. | 709/227 |
| 6,671,724 | B1 | 12/2003 | Pandya et al. | 709/226 |
| 6,678,827 | B1 | 1/2004 | Rothermel et al. | 713/201 |
| 6,701,358 | B1 | 3/2004 | Poisson et al. | 709/223 |
| 6,732,176 | B1 | 5/2004 | Stewart et al. | 709/227 |
| 6,751,729 | B1* | 6/2004 | Giniger et al. | 713/153 |
| 7,028,183 | B2* | 4/2006 | Simon et al. | 713/168 |
| 7,136,374 | B1* | 11/2006 | Kompella | 370/352 |

OTHER PUBLICATIONS

S. Bradner, RFC 2026, "The Internet Standards Process—Revision 3," Harvard University, Inc, Oct. 1996, http://asg.web.cmu.edu/rfc/rfc2026.html.
E. Rosen, Y. Rekhter, RFC2547, BGP/MPLS VPNs, Copyright © The Internet Society (1999). All Rights Reserved. http://www.scit.wlv.ac.uk/rfc/rfc25xx/RFC2547.html.

* cited by examiner

*Primary Examiner*—Ellen Tran
(74) *Attorney, Agent, or Firm*—Barry W. Chapin, Esq.; Chapin IP Law, LLC (57) ABSTRACT

A first node generates and transmits a notification message including routing policy attributes such as network address information and a corresponding gateway identifier. The gateway identifier identifies a gateway in a physical network through which future generated data messages shall be forwarded to at least one host computer (e.g., any computer having an associated network address) as indicated by the network address information. A second node receiving the notification message utilizes the routing policy attributes to dynamically update its database identifying how to forward data packets. In this way, nodes (e.g., CE routers) of a network can be dynamically configured to support routing of messages based on the network address information and gateway identifier disseminated along with the notification message.

54 Claims, 7 Drawing Sheets

| NETWORK ADDRESS INFORMATION | VPN or GATEWAY IDENTIFIER | VPN ATTRIBUTES |
|---|---|---|
| 1.) H.C. (160-1, 160-2) | CE (140-1) | KEY1 |
| 2.) H.C. (160-3 to 160-7) | NONE | NONE |
| 3.) ANY NODE ADDRESS IN NETWORK 150-2 | CE (140-2) | KEY2 |
| 4.) H.C. (160-Z) | H.C. (160-Z) | KEY3 |
| ... | ... | ... |

METHODS AND APPARATUS TO DISTRIBUTE POLICY INFORMATION

BACKGROUND

Virtual Private Networks (i.e., VPNs) provide a secured means for transmitting and receiving data between network nodes even though a corresponding physical network supporting propagation of the data is shared by many users. Typically, the data transmitted between such network nodes (e.g., edge nodes of a service provider network) is encrypted to protect against eavesdropping and tampering by unauthorized parties. Because the physical network is shared, costs of using resources are generally reduced for each of many users.

A physical network such as a service provider network topology may include peripherally located provider edge routers, each of which couples to one or multiple customer edge routers. The customer edge routers, in turn, may couple to private local area networks associated with one or multiple customers. Typically, the service provider network selectively couples the local area networks to each other through links created between its provider edge routers. To support operation, the provider edge routers typically maintain Virtual Routing and Forwarding (VRF) information dictating how to route and forward traffic through the shared physical network to support corresponding VPNs for the different customers.

According to one conventional technique, a service network may be extended beyond provider edge nodes to customer edge nodes. For example, the connectivity model supported by RFC2547 generally enables any CE (Customer Edge) nodes to establish a link between each other for transmission of data messages between corresponding interconnected networks.

SUMMARY

Unfortunately, there are deficiencies associated with conventional techniques of configuring edge routers with configuration data identifying how to forward data packets across an associated service provider network. For example, as discussed above, [Request For Comment 2547] supports a service architecture capable of building and supporting any data path between CE routers. However, such a model does not provide any inherent data encryption services. Therefore, customers that wish to encrypt their traffic must do so before it enters the [RFC2547] network. Although burdensome, this is typically achieved by enabling IPSec (Internet Protocol Security) encryption and running IPSec tunnels between CE routers that belong to a corresponding "encrypted" VPN.

Some service providers have provided at least partial integration of [RFC2547] and IPSec by terminating IPSec tunnels into a Virtual Routing & Forwarding Instance (VRF) at PE (Provider Edge) routers; however, this provides a secure path between the PE and CE devices but does not provide an end-to-end security between the CE nodes. Deployment of IPSec tunnel meshes is analogous to the "overlay" model used in Frame-relay or ATM (Asynchronous Transfer Mode) networks. Although network-based, this conventional solution of terminating IPsec tunnels at PE routers does not extend IPSec between security gateways of different customer sites.

It is an advancement in the art to combine the CE-to-CE protection methodologies with the "any-to-any" node connectivity model provided by [RFC2547] so that the customer experience is seen as the "best of both worlds." Accordingly, one embodiment of the present invention includes an apparatus and method for disseminating configuration data such as routing policy information to edge nodes of a network supporting virtual networks without, e.g., a need for using direct routing protocol exchange or IP based tunnels such as those provided by GRE (Generic Routing Encapsulation). This enhanced model supports CE-to-CE data protection while eliminating the requirement for pre-established IP-based tunnels or routing adjacencies between [IPSec] security gateways.

More specifically, an embodiment of the present invention involves generating a notification message (at a first node of a physical network) to include routing policy attributes such as network address information and a corresponding gateway identifier. The gateway identifier identifies a gateway in the physical network through which future generated data messages shall be forwarded to at least one host computer (e.g., any computer having an associated network address) as indicated by the network address information of the gateway identifier. In other words, the network address information identifies a single or range of network addresses of computers.

The first node transmits or distributes the notification message to a second node (or multiple nodes) of the physical network, thereby enabling the second node (and potentially other nodes) to establish a secure virtual network connection between the second node (or other nodes) and the first node or other node specified by the gateway identifier on which to forward data messages to the one or more host computer(s) based on the corresponding gateway identifier. For example, the second node may generate and maintain a map including configuration data (based on the routing policy attributes such as the network address information and gateway identifier) so that data traffic through the second node to the at least one computer identified by the network address information is forwarded through the gateway as identified by the gateway identifier. Based on this technique of disseminating routing policy attributes, nodes (e.g., CE routers) of a network can be dynamically configured to support routing of messages based on receipt of the network address information and gateway identifier (e.g., an IPsec identity such as Ipv4, distinguished name, etc.).

A corresponding map at the second node, after being dynamically updated based on the routing policy attribute, includes configuration data indicating on which virtual network to forward data depending on the address (or subnet) associated with a host computer to which the data messages are forwarded. For example, as previously mentioned, the notification message includes a gateway identifier and network address information. Configuration data associated with the virtual network stored in the map may identify a VPN connection (including the gateway as identified by the gateway identifier) on which to forward data messages destined for computers identified by the corresponding network address information.

Embodiments of the invention thus allow a network administrator of a customer network at a first facility (e.g., a first LAN location for the customer) that operates on a service provider network to automatically disseminate (e.g., using a protocol such as the Border Gateway Protocol), in a notification message, security gateway information and corresponding network address information to other customer facility locations (e.g., other LANs for that same customer located elsewhere on the service provider network). The network address information identifies a set of host computer systems (e.g., an address range or list of one or more computers) within that first LAN facility (e.g., a IP subnet address range, or a list of host IP address) that must be communicated with, from other customer LAN facilities, in a secure manner (e.g., using a VPN). The corresponding security gateway identifier indicates the endpoint or termination point of that secure connection through which communications must pass in order to communicate with those hosts that have addresses that match the network address information (i.e., hosts within the specified address range). As an example, if a subnet in the LAN facility contains a group of sensitive computers that must be communicated with (from hosts outside of that LAN facility) in a secure manner, the notification message can contain network address information identifying the subnet of all of those hosts. The gateway identifier can contain the address of the firewall or other gateway device, such as the customer edge router that couples that LAN facility to the service provider network. That gateway device (i.e., the customer edge router) is pre-configured with VPN software or hardware to accept secure VPN connections. As such, when embodiments of the invention disseminate this notification information to remotely located customer edge routers at other customer facilities (i.e., that link other LANs for that customer to the service provider network), those other customer edge routers can use this information to establish a secure connection to the device having the IP address of the gateway identifier when any communications (e.g., packets) are destined for a host computer that falls within the range of address(es) specified by the network address information.

Upon receipt of a data message at the second node such as a data packet to be transmitted over a service provider network, the second node identifies a destination address of the data message. If the destination address (and potentially also a source address) of the data message matches an entry in the corresponding (routing) map at the second node, the second node routes the data message depending on configuration data stored in its map. The map may indicate through which gateway (such as the first node) or virtual connection (e.g, a VPN including the gateway as an endpoint), if any, to forward data information to a particular (computer) destination address. The second node, such as a customer edge router at one of the remote LAN facilities, obtains map configuration information from the notification message received (e.g., using BGP) from the first node location (i.e., the first customer edge router that sent the notification message indicating the network address information and the gateway identifier). For example, transmission of data messages (in a reverse direction with respect to the notification message discussed above) may include transmitting a data message at a first computer through a CE router (e.g., second node) across a service provider network to another CE router (e.g., first node), where the message is then forwarded to a corresponding target computer based on a destination address of the data message. Thus, in the context of a physical network supporting connectivity through customer edge routers of a service provider network, a notification message including routing policy attributes (e.g., network address information and gateway identifier) dictates how data messages to a particular host or a range of hosts (as identified by network address information) shall be forwarded through the second node and corresponding service provider network.

In one application, the notification message and routing policy attributes transmitted from the first node are disseminated to customer edge nodes (e.g., the second node) of a network supported by RFC 2547 based on a distribution protocol such as BGP (Border Gateway Protocol). The Border Gateway Protocol (BGP) is an interautonomous system routing protocol used by ISPs (Internet Service Providers) to exchange routing information in a network. Notably, a network supported by RFC 2547 does not inherently support encryption. However, corresponding maps (which are dynamically updated or modified as discussed above) in CE routers of the network may identify secured network connections (e.g., a VPN including an endpoint identified by the gateway identifier) on which to forward data information. Consequently, customers can achieve secure data transmissions between sites connected to an RFC 2547 network because security of the data is automatically managed by the corresponding CE routers.

As mentioned, a corresponding map at a network node identifies a policy for routing or forwarding data messages. By "policy", what is meant in one embodiments is that for packets destined for host computers that fall within one of the network address information ranges of a remote LAN facility (e.g. addresses within subnet lists specified in the map), the packets must be sent in a secure manner using the gateway identifier as an endpoint for a VPN tunnel that may or may not already exist (i.e., the VPN tunnel may already be established, or may need to be setup from the second node to the first node before packets falling within that address range can be sent from the second node). In the above example, if a security tunnel already exists between the second node and the first node and is the path specified by the map at the second node for forwarding a corresponding data message to the at least one computer, the data message is transmitted over the existing security tunnel. If a specified security tunnel does not exist, the second node and first node establish a security tunnel based on IPSec and IKE (Internet Key Exchange) for transmission of the data message.

In addition to transmitting a gateway identifier and network address information as discussed above, the first node may transmit additional routing policy attributes to the second node to more particularly define a policy for routing the data messages on a corresponding virtual network connection through the gateway to the at least one host computer.

More specifically, one embodiment of the present invention is directed to a computer program product that includes a computer readable medium having instructions stored thereon for dynamically updating configuration data in a network. The instructions, when carried out by a processor of the data communication device, cause the processor to perform the steps of: i.) receiving a) network address information associated with at least one host computer, and b) a corresponding gateway identifier of a gateway in the physical network; ii.) generating a notification message including the network address information and the corresponding gateway identifier; and iii.) transmitting the notification message to a second node of the physical network enabling the second node to establish a virtual network connection between the second node and the first node on which to forward data messages to the at least one host computer based on the corresponding gateway identifier.

Another embodiment of the present invention is directed to a computer program product that includes a computer readable medium having instructions stored thereon for configuring a network to support routing of network messages. The instructions, when carried out by a processor of the data communication device, cause the processor to perform the steps of: i.) receiving a notification message from a sending node of the physical network, the notification message including network address information and a corresponding gateway identifier of a gateway of the physical network; and ii.) based on contents of the notification message, modifying a map at the receiving node to include the network address information and configuration data identifying at least part of a virtual network connection between the receiving node and the sending node on which to forward data messages through the gateway to a destination node.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Use of IPSec to protect traffic between two VPN subnets requires the IPSec security gateways protecting the subnets to agree on a security policy. Many elements of the security policy may be configured once in the security gateway and the elements are independent of the topology of the VPN. There are at least two security attributes that may not be known a priori and require repetitive updates to all the security gateways as the network topology changes. The two security attributes include: i) trusted subnets (i.e., IP network address and mask) protected by a peer security gateway and ii) the security gateway's identity.

One embodiment of the invention leverages a use of the BGPv4 protocol to distribute these two security policy attributes between peers of a network. Since BGPv4 is used to propagate the subnets required for routing purposes, identifying the IP subnets as 'trusted subnets' and associating a 'security gateway identity' with a set of 'trusted subnets' allows an IPSec security policy to be completed and distributed dynamically for each security gateway. The automated discovery of topology specific peer security policy attributes allows the protected VPN topology to evolve, change, and grow while even though there may be only a single provisioning action at the time of security gateway installation. It is possible to also include more granular IPSec security policy attributes (in addition to the two above) such as IP tunnel end-point identities, protocol identities and application port identities. The inclusion of these IPSec security policy attributes may allow a more refined security policy. Regardless of the number of security policy attributes propagated by BGPv4, the attributes are associated with the IP network address that BGPv4 is already propagating for basic VPN routing topology. Thus, there is no requirement that the IPSec security associations be used to exchange routing information such as configuration data and the routing scalability property of a network supported by [RFC2547] may be preserved.

Although the techniques described herein can be used in networking applications, and particularly to communication devices such as routers that provide connectivity to many remote devices through a network link, the techniques are also well-suited for other applications as well.

Figure 1:
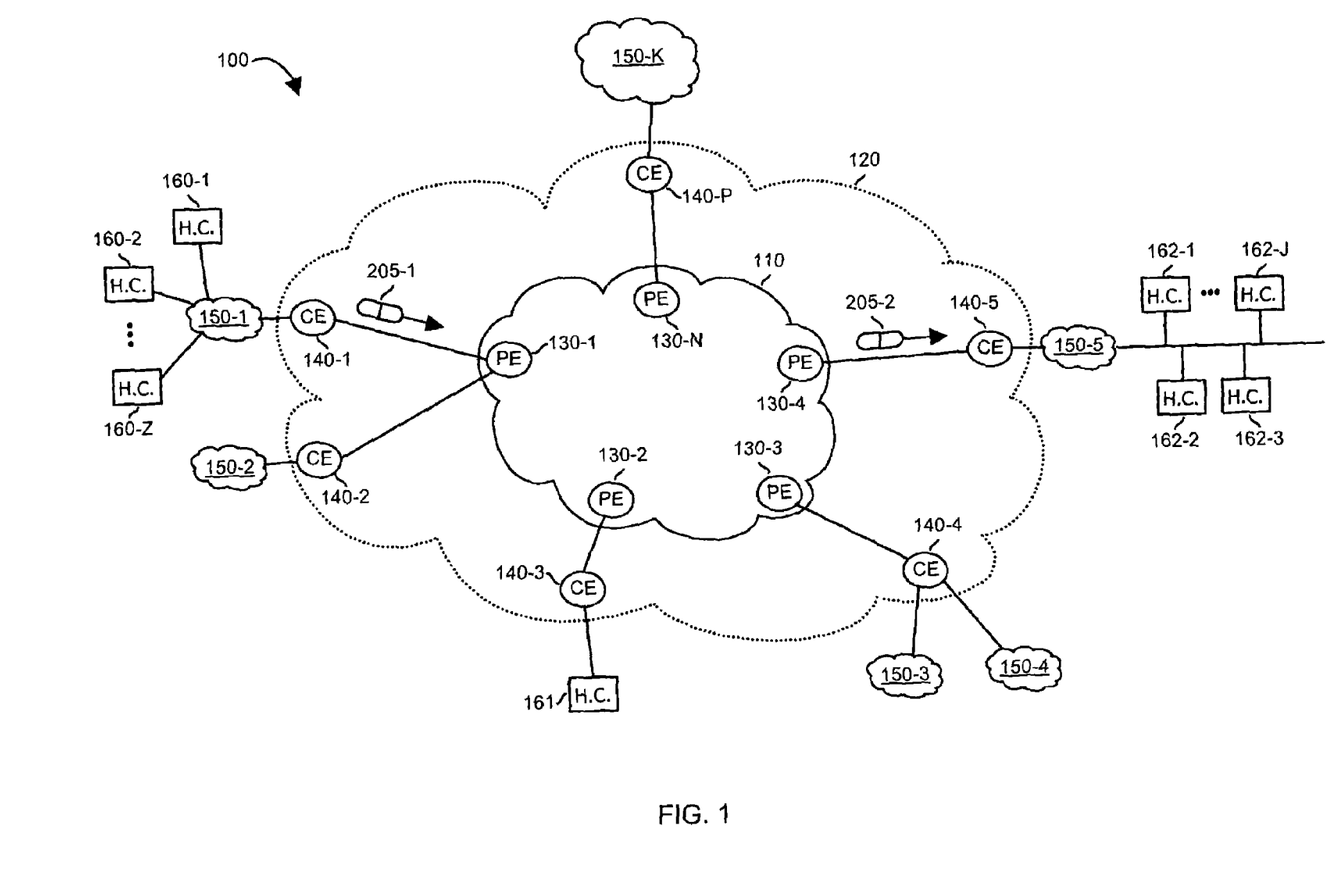
FIG. 1 is a pictorial diagram of a communication system to dynamically configure edge nodes according to an embodiment of the invention.

FIG. 1 is a diagram of communication system 100 supporting dynamic update of configuration information according to an embodiment of the present invention. As shown, communication system 100 includes host computers 160-1, 160-2, . . . , 160-Z, 161, 162-1, 162-2, . . . , 162-J, and networks (such as private local area networks) 150-1, 150-2, . . . , 150-K that communicate with each other over virtual network 120. Virtual network 120 includes, at its periphery, customer edge nodes 140-1, 140-2, . . . , 140-P that communicate with each other over service provider network 110. Service provider network 110, at its periphery, includes provider edge nodes 130-1, 130-2, . . . , 130-N that also communicate with each other. In general, customer edge nodes 140 of virtual network 120 determine a policy for routing data messages (e.g., TCP/IP data packets) based on corresponding locally stored configuration data.

In one embodiment, virtual network 120 operates according to the connectivity model of RFC2547 and configuration data associated with a corresponding customer edge node 140 identifies a VPN on which to forward data messages when communicating with a particular node of communication system 100. For example, a node such as a computer in network 150-2 may attempt to transmit a message to host computer 162-1 associated with network 150-5. Prior to transmitting data messages such as data packets generated by the node at network 150-2, customer edge node 140-2 checks its corresponding configuration data to determine a policy for forwarding the data messages to host computer 162-1.

Configuration data at CE node 140-2 may indicate (depending how it is configured) that data messages from any node of network 150-2 to host computer 162-1 shall be encrypted based upon a security tunnel between customer edge node 140-2 and customer edge node 140-5. Thus, for a case in which a node in network 150-2 sends messages to host computer 162-1, virtual network 120 establishes a security tunnel between customer edge node 140-2 and customer edge 140-5 if such a tunnel does not already exist. The security tunnel (e.g., a VPN) may be established between gateways at corresponding customer edge nodes 140-2 and 140-5 based on IPSec and IKE. Thereafter, customer edge node 140-2 forwards the data messages through the security tunnel to customer edge node 140-5 which, in turn, forwards the data message to host computer 162-1. In a similar way, configuration data at other customer edge nodes 140 dictates how data messages shall be forwarded, if at all, through virtual network 120 to a corresponding target.

As briefly discussed, a service provider may deploy virtual network 120 based on an [RFC2547] service using a number of backbone tunneling techniques such as those described in [RFC2547], [MPLS-in-IP], or [PE-PE-IPsec].

[RFC2547] employs a hierarchical routing model providing scalable distribution of routing/forwarding attributes. IPSec encryption between customer edge nodes 140, as previously discussed, optionally relies upon an IP address partitioning and route forwarding state created by the [RFC2547] infrastructure, which can be deployed independently of a chosen type of backbone tunneling through virtual network 120. The CE-CE [IPSec] topology may include a point-to-point relationship between CEs for data protection; however, the routing plane associated with the CE-CE topology leverages the [RFC2547] hierarchical routing model.

To couple a CE security policy associated with virtual network 120 and PE routing plane of service provider network 110, each CE node 140 ascertains through configuration, an administrator, or other means, whether it will be used as a security gateway (e.g., whether it will be an endpoint of a tunnel for communicating with nodes across virtual network 120).

After determining that a CE node 140 shall be a gateway, the corresponding CE node 140 advertises it's gateway identifier (e.g., "Security Gateway Identity") used for [IKE] and [IPSec] peer end-point termination to a corresponding PE node 130 in service provider network 110 (e.g., CE node 140-1 notifies PE node 130-1 via message 205-1) using a data distribution protocol such as [BGP-4]. The gateway identifier is associated with a 'trusted subnet' (e.g., network address information of one or multiple computers in communication with a corresponding network 150 whose communications shall be protected) represented as a prefix that the corresponding CE node 140 protects.

Figure 2:
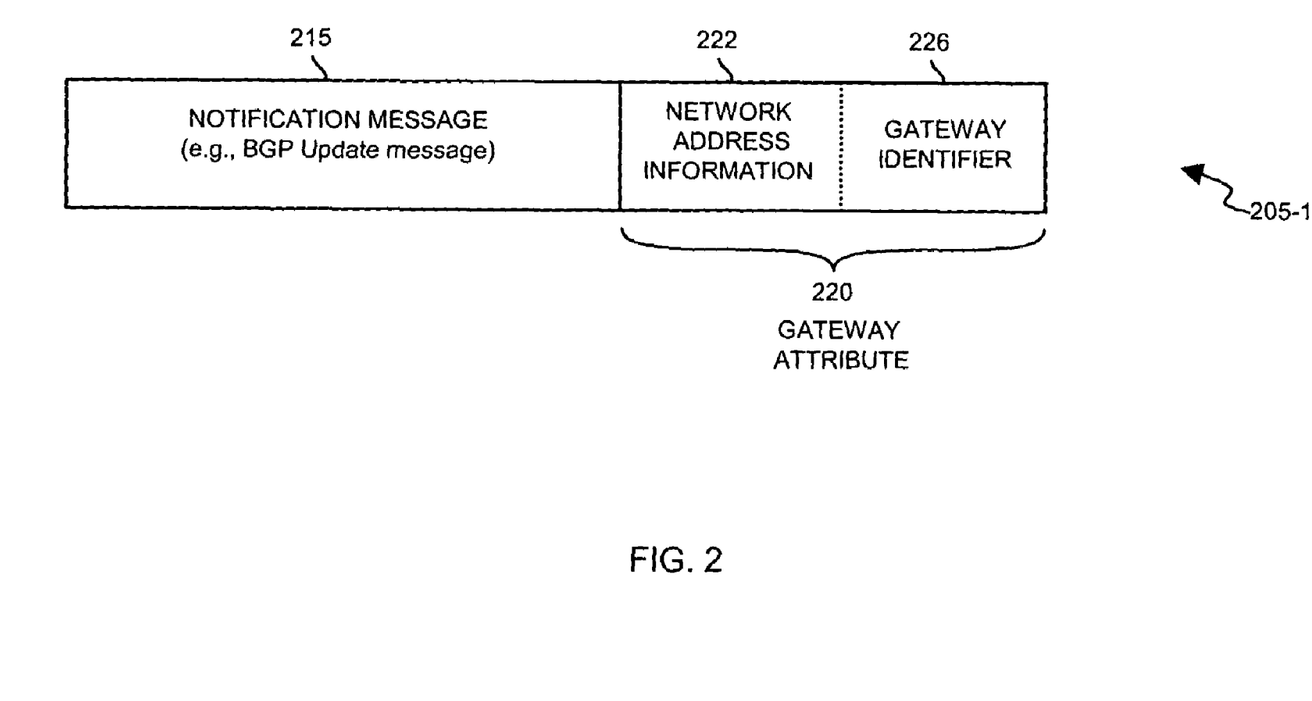
FIG. 2 is a diagram of a configuration message to dynamically update edge nodes according to an embodiment of the invention.

FIG. 2 is a diagram of message 205-1 including notification message 215, network address information 222, and gateway identifier 226 according to one embodiment of the invention. Network address information 222 identifies one or multiple network addresses such as network addresses associated with host computers 160-1, 160-2. Gateway identifier 226 identifies a node such as CE node 140-1 or other gateway in communication system 100.

One purpose of message 205-1 (or derivative thereof such as message 205-2) is to notify other CE nodes 140 in virtual network 120 of an end point of a security tunnel through which messages shall be forward when communicating with devices corresponding to nodes identified by network address information 222. For example, message 205-1 includes gateway attribute 220. For illustrative purposes, assume that gateway identifier 226 of gateway attribute 220 identifies CE node 140-1 as being a gateway (or a specific one of multiple gateway endpoints that terminate at CE node 140-1) and associated network address information 222 identifies addresses of nodes associated with network 150-1 such as host computer 160-1 and 160-2.

Based on the receipt of gateway attribute 220 in message 205, CE node 140-5 updates its configuration data for establishing pathways such as security tunnels. More specifically, in the present example, CE node 140-5 updates its configuration data for establishing secured communications between CE node 140-5 and CE node 140-1 to properly forward messages generated by network 150-5 (or its associated nodes such as host computers 162-1, . . . , 162-J) to protected target devices (e.g., host computers 160-1 and 160-2) identified by network address information 222. In this way, gateway attribute 220 identifies a node (based on gateway identifier 226) through which messages shall be forwarded to corresponding communication devices identified by network address information 222.

In one application, gateway identifier 226 is an IPv4 address where the [IKE] and [IPSec] authentication and encryption services will be established. Upon receiving information of protected nodes (as identified by network address information 222) and corresponding gateway identifier 226 of the sending customer edge node 140, the corresponding PE node 130 (in the present example, PE node 130-1), in turn, advertises the trusted subnet prefixes (network address information 222) and the associated gateway identity 226 to other PE nodes 130 based on a data distribution protocol such as MP-BGP.

Thus, a PE node 130 that receives gateway attribute 220 via an [MP-BGP] message 205 (a) identifies which VPN the prefix and security gateway identifier 226 (e.g., end-point) is associated with, and (b) advertises (e.g., via message 205-2) this information to any security gateway CE nodes 130 that belong to the VPN. Identification of which VPN an update message 205 belongs may be determined by the "route target" extended community attribute as described in RFC 2547 incorporated herein by this reference.

Figure 3:
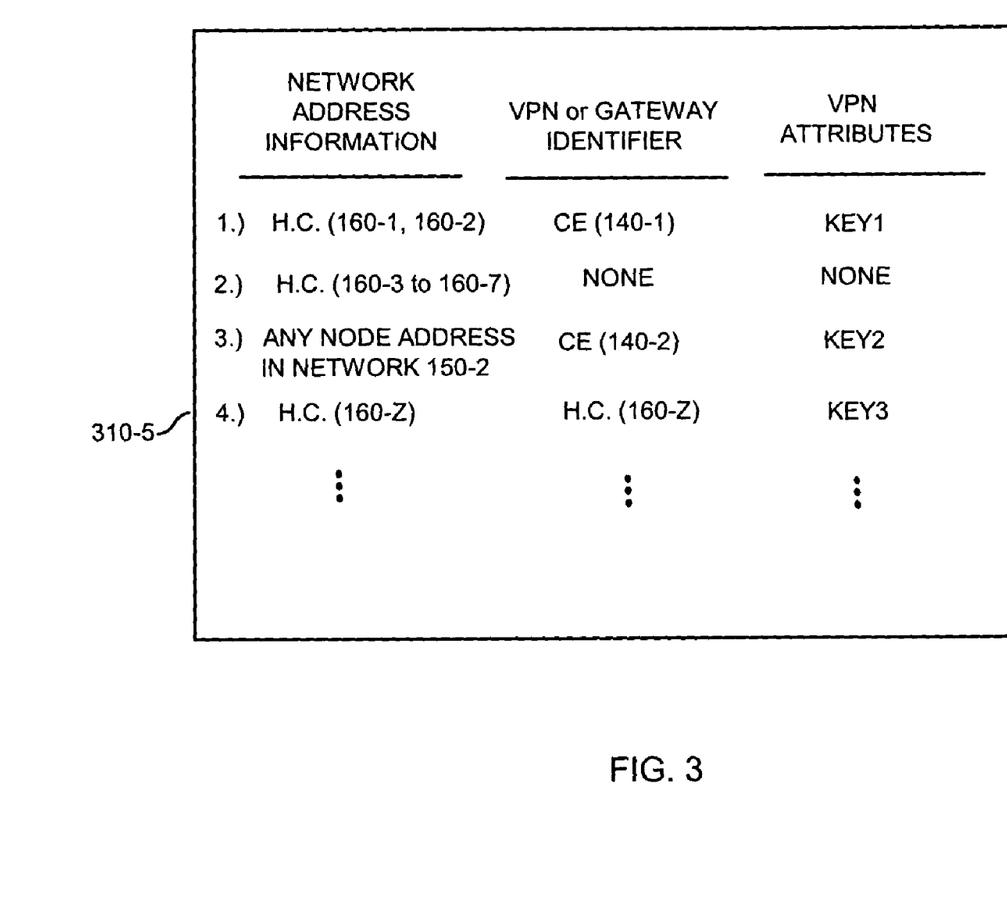
FIG. 3 is a diagram of configuration data that is dynamically updated based on receipt of configuration messages according to an embodiment of the invention.

FIG. 3 is a diagram illustrating configuration data 310-5 (such as a table or database) according to one embodiment of the invention. As shown, configuration data 310-5 (associated with corresponding CE node 140-5) includes information identifying how to forward data messages through CE node 140-5 to a target based dynamic updating configuration data 310 in response to receiving gateway attributes 220 in corresponding message 205. For example, based on receipt of message 205 (in FIG. 2), entry #1 in configuration data 310-5 (FIG. 3) is updated to identify that messages through CE node 140-5 to host computer 160-1 and 160-2 shall be sent through a gateway at CE node 140-1. Configuration map 310-5 will be referenced only when data is sent through CE node 140-5 with host source addresses in network 150-5 (or whatever is locally configured). An IPsec policy may require both source and destination address ranges to send data over a secure tunnel.

For example, according to one embodiment, a decision to send traffic into an encrypted VPN may be based on a combination of received policy (the destination network address range received via a notification message) and the locally defined policy (e.g., a source network address range). In such an embodiment, traffic is not encrypted merely based on receipt of a network address range with a security gateway identity. Instead, a data flow that enters an encrypted VPN must match the source and destination policy. More specifically, CE node 140-2 may protects LAN_1 150-2 while CE node 2 140-5 may protect LAN_2 150-5. If CE node 1 advertises LAN_1 with protection, CE node 2 will only send data destined for LAN_1 into the encrypted VPN if it matches the combined policy of protect traffic from LAN_2 to LAN_1. Thus, one embodiment of the invention supplies the destination prefix using a scalable distribution means while the source prefix is locally defined. The source prefix may be manually configured.

Other entries of configuration data 310-5 reflect updates prompted by receipt of corresponding messages 205. For example, entry #4 reflects receipt of message 205 including a gateway identifier of host computer 160-Z and network address information 222 identifying host computer 160-Z. In this example, an identified end of a secured tunnel is host computer 160-Z. Thus, a VPN may extended beyond CE nodes for yet additional protection.

Note that each CE node 140 includes configuration data 310 that varies depending on how data messages shall be forwarded through virtual network 120. For example, CE node 140-1 includes configuration data 310-1, CE node 140-2 includes configuration data 310-2, etc.

Figure 4:
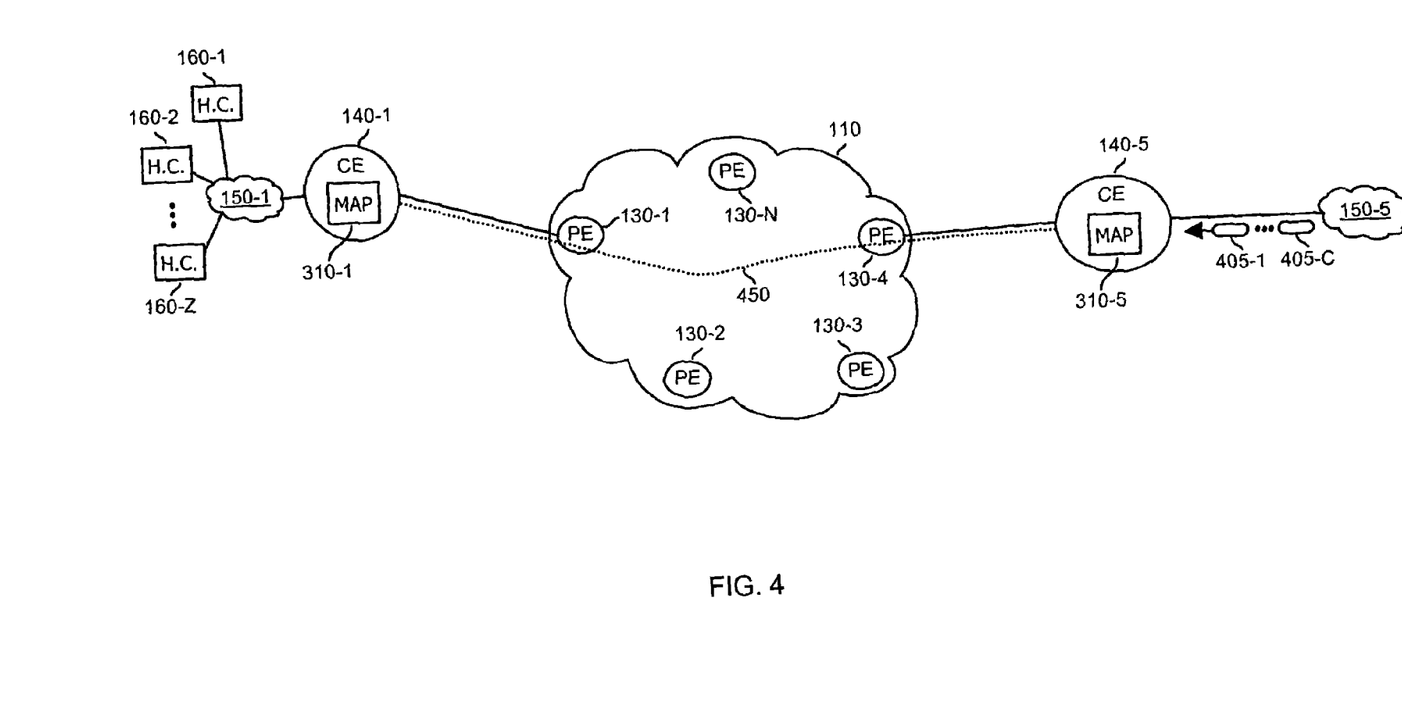
FIG. 4 is a pictorial diagram illustrating use of configuration data in a corresponding map of an edge node according to an embodiment of the invention.

FIG. 4 is a diagram illustrating a process of forwarding data messages 405 through virtual network 120 according to an embodiment of the invention. As shown, CE node 140-5 receives messages 405-1, . . . , 405-C. Prior to forwarding messages 405, CE node 140-5 compares destination addresses associated with messages 405 generated by network 150-5 (or associated nodes such as host computers 162) and compares them to those identified in its corresponding configuration data 310-5. Based on configuration data 310-5, CE node 140 determines a corresponding policy for forwarding messages 405. For example, entry #1 of configuration data 310-5 (FIG. 3) indicates that messages 405 to host computers 160-1 and 160-2 shall be sent on virtual network pathway 450 (such as a secured tunnel) established between CE node 140-5 and CE node 140-1 using KEY1 such as an encryption key.

In addition to specifying an endpoint, gateway or VPN on which to forward data messages, configuration data 310-5 may identify additional attributes of virtual network pathway 450 in other embodiments.

As indicated by entry #2 of configuration data 310-5 (FIG. 3), data messages (such as any of messages 405) from network 150-5 to any of host computers 160-3, 160-4, 160-5, 160-6, and 160-7 need not be protected or sent on any particular secured pathway. For example, there is no specified gateway through which to transmit messages 405 to host computers 160-3 through 160-7.

As indicated by entry #3 of configuration data 310-5 (FIG. 3), any data messages 405 from network 150-5 (or associated nodes such as host computers 162) sent through CE node 140-5 to any network address of a node associated with network 150-2 shall be forwarded through a secured tunnel between CE node 140-5 to CE node 140-2 using encryption KEY2. In this instance, one end-point of a corresponding secured tunnel is CE node 140-5 through which data messages are transmitted while the other end-point indicated by corresponding configuration data 310-5 is CE node 140-2.

Entry #4 of configuration data 310-5 (FIG. 3) illustrates that an endpoint of a secured tunnel may extend to a terminal such as host computer 160-Z. In this case, CE node 140-5 forwards messages 405 destined for host computer 160-Z through a secured tunnel established between CE node 140-5 and terminal gateway is host computer 160-Z. Thus, a gateway identifier (such as an end-point of a secured tunnel as identified by gateway identifier 226) is not limited to identifying CE nodes 140 as an endpoint of a tunnel. A terminal node such as a host computer (or multiple computers identified by, for example a subnet address) may be identified by gateway identifier 226 as an end of a tunnel (or ends of tunnels).

Figure 5:
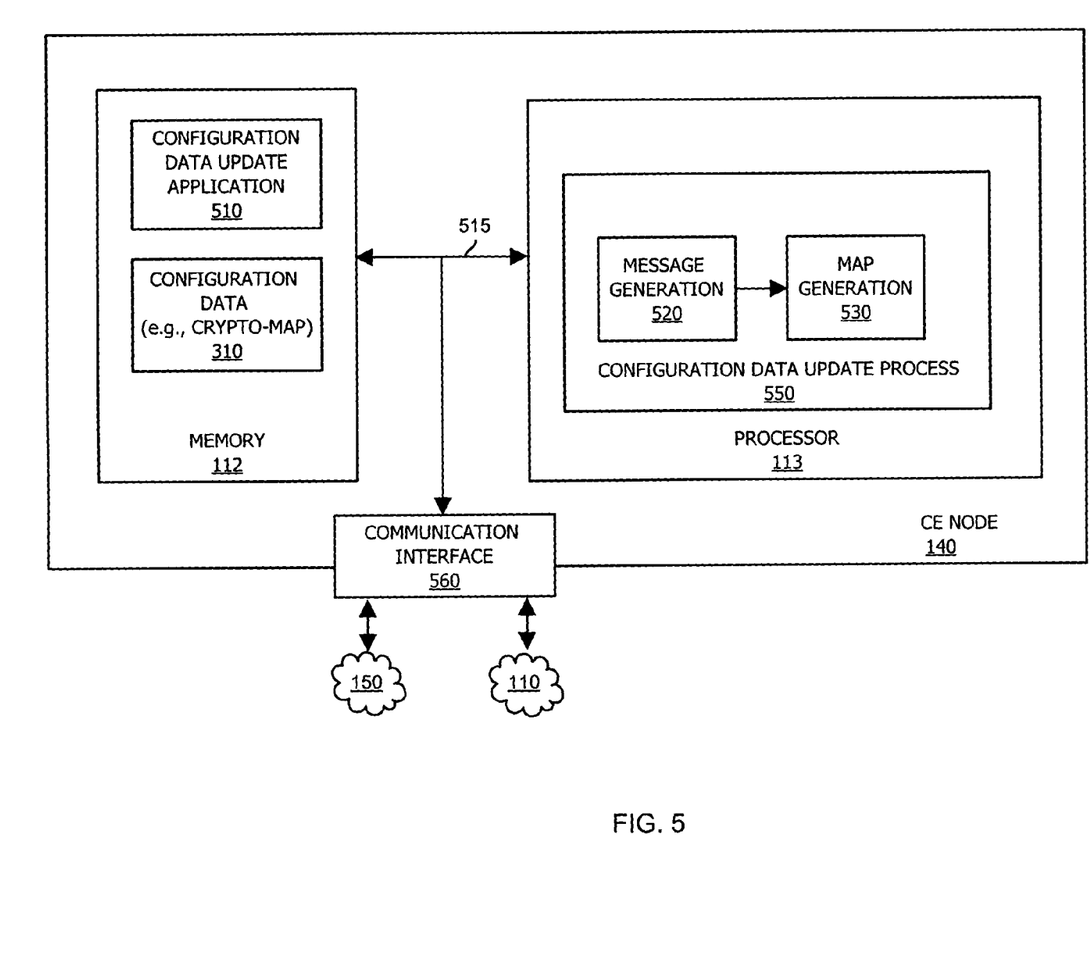
FIG. 5 is a diagram of a computer system and its functional components supporting dynamic configuration according to an embodiment of the invention.

FIG. 5 is a block diagram of CE node 140 according to an embodiment of the present invention. As shown, CE node 140 is a computerized device including interconnect 515 such as a data bus or other circuitry interconnecting memory 112, processor 113, and communication interface 560. Processor 113 may be any type of central processing unit, microprocessor, processing device, controller of other electronic circuitry capable of accessing configuration data update application 510 to execute, run, interpret, operate or otherwise perform configuration data update application 510, thus supporting dynamic updates to configuration data 310 according to embodiments of the invention as explained herein. In other words, configuration data update application 510 may be embodied as a software program that enables CE nodes 140 such as data communication devices (e.g., CE routers) to dynamically configure themselves based on receipt of gateway attributes 220 in message 205.

Memory 112 stores configuration data update application 510, and configuration data 310 associated with a corresponding CE node 140. In general, application 510 represents software code, data and/or logic instructions executed by processor 113. When executed, processor 113 creates configuration data update process 550 including message generation 520 and map generation 530 processes, which are executed at CE nodes 140 depending on whether a CE node 140 is a sending or receiving node. For example, the message generation 530 process is executed on a sending node (such as CE node 140-1) to generate messages 205-1 including gateway attribute 220 distributed through virtual network 120 to corresponding target CE nodes 140. Map generation 530 process is executed at a receiving node (such as CE node 140-5) to update its configuration data 310 when a received gateway attribute 220 pertains to the corresponding CE node 140 as discussed. These processes are more particularly described in connection with FIGS. 6 and 7.

Figure 6:
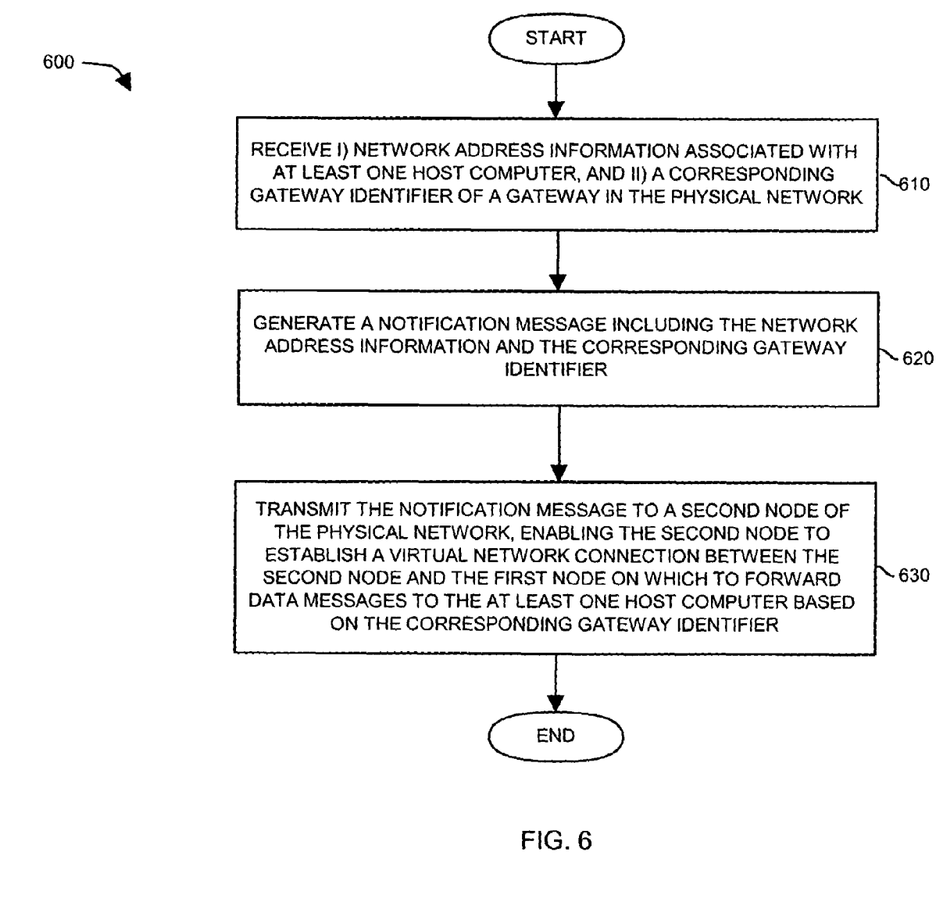
FIG. 6 is a flow chart illustrating a technique supporting dynamic configuration of edge routers according to an embodiment of the invention.

FIG. 6 is a diagram of flow chart 600 according to an embodiment of the invention. In general, flow chart 600 illustrates a technique of dynamically updating configuration data 310 associated with communication 100 and, more specifically, CE nodes 140 of virtual network 120.

In step 610, a given CE node 140 receives network address information 222 associated with at least one host computer and ii) a corresponding gateway identifier 226 of a gateway (e.g., a network node) in communication system 100.

In step 620, the given CE node 140 generates a notification message 205 including network address information 222 and gateway identifier 226.

In step 630, the given CE node 140 generates message 205 to a receiving PE node 130 that, in turn, distributes gateway attribute 220 to other CE nodes 140. As previously discussed, CE nodes 140 of virtual network 120 update their corresponding configuration data 310 depending on whether information within gateway attribute 220 pertains to a VPN associated with the corresponding CE node 140. This is more particularly discussed in connection with FIG. 7.

Figure 7:
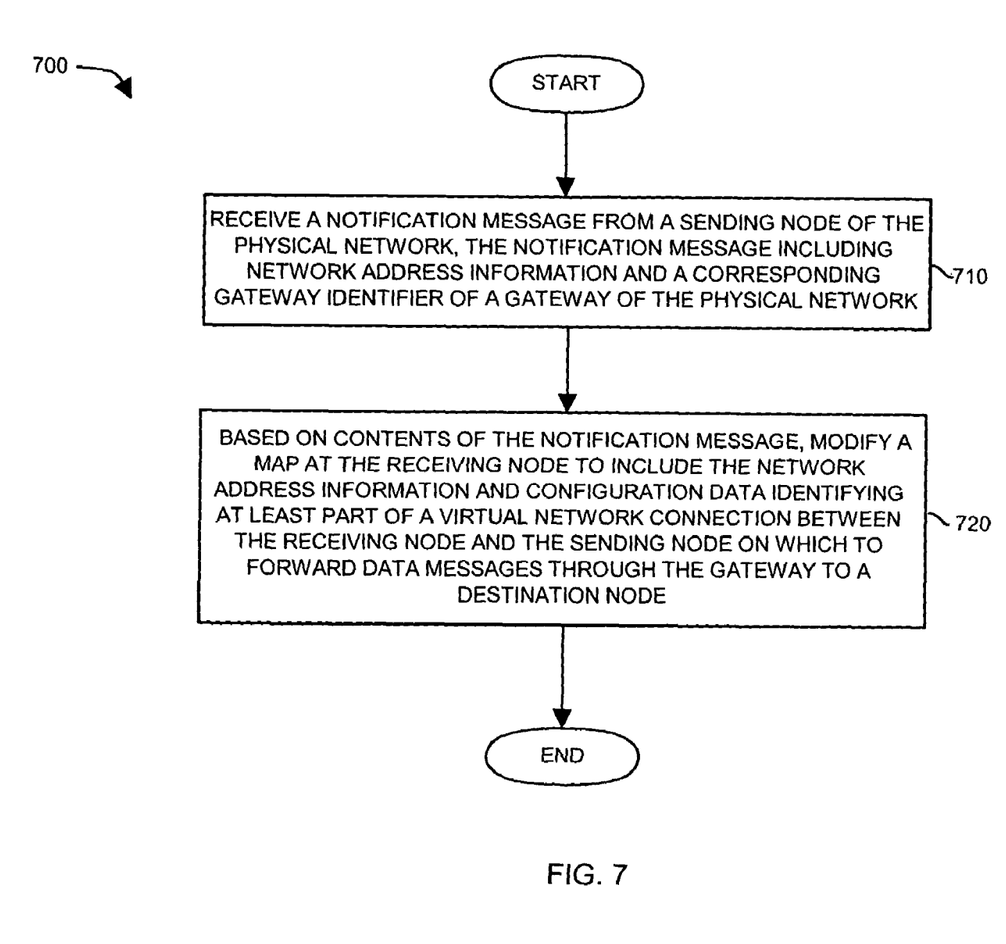
FIG. 7 is a flow chart illustrating a technique supporting dynamic configuration of edge routers according to an embodiment of the invention.

FIG. 7 is a diagram of flow chart 700 according to an embodiment of the present invention.

In step 710, a CE node 140 receives message 205 including gateway attribute 220 from a sending CE node 140 disseminating updated routing information.

In step 720, the receiving node identifies whether received message 205 includes configuration information pertinent to the receiving node (e.g., a VPN that is to be supported by the receiving node). If so, the receiving CE node 140 modifies its corresponding configuration data 310 to include network address information 222 to later establish a virtual network connection (such as a VPN) between the receiving CE node 140 and sending CE node 140 on which to forward future messages through a corresponding gateway (e.g., sending CE node 140) to a destination node such as a host computer identified by network address information 222.

Distribution of Gateway Endpoints

A CE node 140 may send encrypted and non-encrypted traffic (e.g., messages 405) through a PE node 130 for delivery to other members of its VPN. CE nodes 140 that belongs to an "encrypted" VPN build a Security Association (SA) with a remote CE node 140 that also belongs to the same VPN, and is a member of the encryption service.

When traffic that needs to be encrypted is sent from a CE node 140 that belongs to an "encrypted" VPN, the CE node 140 establishes a Security Association (SA) with the remote CE node 140 through which the destination of the incoming packet is reachable. To achieve this aim, the CE node 140 needs to discover the remote peer's trusted subnet prefix (e.g., based on network address information 222) and the associated security gateway identity (e.g., based on gateway identifier 226) of the peer, and then build the [IKE] and [IPSec] security association.

Discovery of end-point addresses may be achieved through direct [BGP-4] exchange with a PE node 130. If [BGP-4] is not established with a customer site, then a different discovery protocol may be used.

Certain [RFC2547] deployments use [BGP-4] on PE-CE links. Typically, these sessions only carry standard [BGP-4] attributes. As previously discussed, gateway attribute 220 supports dynamic update of configuration data at CE nodes 140. In one embodiment, CE nodes 140 support the capabilities as specified in [EXTCOM].

When a CE node 140 advertises routes from an "encrypted" VPN into the backbone, it attaches a new BGP extended-community attribute (e.g., gateway attribute 220) to all trusted subnet prefixes for which encryption is desired. A PE node 130 that receives such an update exports those trusted subnet prefixes along with the "Security Gateway Identify" attribute.

A PE node 130 that receives the update advertises the trusted subnet prefixes and security gateway identities to any relevant CE nodes 140 that are (a) members of the "encrypted" VPN, and (b) are running [BGP-4] with the PE node 130.

The Extended Community Attribute is a transitive optional BGP attribute, with type code 16, as specified in [EXTCOM]. One embodiment involves a use of the Opaque Extended Community, as specified in section 6.4 of [EXTCOM]. The value of the high-order octet of this extended type may be either 0x03 or 0x43. The low-order octet of this extended type carries the sub-type with a specified value and indicates that it is a "Security Gateway Identity." The following 48 bits provide the data corresponding to the "Security Gateway Identity" (e.g., gateway identifier 226).

CE Node Supporting IPsec

A CE node 140 that wishes to belong to an "encrypted" VPN, and use the techniques herein, may depend on the procedures described in [IPsec]. For example, a CE node 140 may provide a Security Policy Database (SPD), as described in section 4.4.1 of [IPSec], which is used to determine the disposition of all IP traffic inbound or outbound from the node. Each entry within the database may specify whether traffic matching the policy should bypass IPsec processing, be discarded, or be subject to IPSec processing.

A CE node 140 may support the ability to specify "Selectors," as described in section 4.4.2 of [IPSec]. These selectors may be a set of IP and upper layer protocol field values that are used by a Security Policy Database (SPD) (e.g., configuration data 310-5) to map traffic to a Security Association (SA).

The Security Policy Database and Selector attributes may be populated with the "Security Gateway Identity" and the associated "trusted subnet" prefixes. The population of the SPD from [BGP-4] may be an automated process with the appropriate [BGP-4] controls provided by a CE node 140.

A CE node 140 may enable the creation of security associations in the Security Association Database (SAD), as described in section 4.4.3 of [IPsec], that contains parameters derived by traffic matching the [BGP-4] injected Selectors in the SPD. This database is used to determine what [IPSec] services are offered to IP packets.

CE-CE Security Association

A CE node 140 may support an automated Security Association/Key management protocol for the purpose of establishing and maintaining Security Associations between two [IPSec] peer end-points. One example of such a protocol is [IKE].

There are several options available to CE nodes 140 with respect to IPsec tunnel setup and encryption of traffic. For example, CE-CE authentication and/or encryption of selective packets may be based on traffic flow initiated establishment of security associations. Additionally, CE-CE authentication and/or encryption of selective packets may be based on pre-established [IPSec] security associations. Each of these options is more particularly described later in this specification.

Regardless of which option is used, on receipt of traffic that is matched to an SPD policy that requires [IPSec] processing, a CE node 140 checks whether a Security Association (SA) already exists with the [IPSec] Security Gateway address. If a SA (e.g., a secured tunnel) already exists, then the CE node 140 encrypts the traffic and forwards it over a secured tunnel toward a PE node 130. If no SA exists, the CE node 140 uses [IKE] or similar protocol to establish the SA with the security gateway identity.

CE-CE Encryption of Selective Packet Flow

CE-CE encryption may be driven by traffic flow and a CE node 140 may choose to selectively encrypt packets based on a 'Selector' match. On receipt of a packet that is matched by the CE node's configuration data for encryption, the CE node 140 establishes a SA with the remote CE router through which the destination is reachable.

As a CE node 140 is running [BGP-4] with a PE node 130, it can dynamically build the 'Selector' criteria based on receipt of routing updates that carry gateway attribute 220. Using this information, the CE node 140 identifies which routes are associated with a remote site, and also which of these routes needs encryption. For the routes that need encryption, the CE determines a "Security Gateway Identity" associated with those routes.

A CE node 140 dynamically establishes [IPSec] SA's between CE and PE routers. These [IPSec] tunnels may be used to protect the [BGP-4] exchange of 'Trusted Subnets' and 'Security Gateway Identities' between the PE and CE nodes. Alternatively, CE and PE nodes may use [BGP-MD5] on the [BGP-4] session to authenticate network address information 222 and associated gateway identifier 226.

CE-CE Encryption with Pre-Established IPsec Security Associations

A CE node 140 may pre-establish [IPSec] tunnels between CE nodes 140 based on configuration data 310. [IPSec] SA's may be established automatically upon population of the SPD that occurs upon receipt of a 'Trusted Subnet' prefix with a valid "Security Gateway Identity". The CE node 140 encrypts traffic destined to a route via the established [IPSec] security association.

The CE node 140 may pre-establish [IPSec] SA's between the CE and PE nodes. These [IPSec] tunnels may be used to protect the [BGP-4] exchange of 'Trusted Subnets' and 'Security Gateway Identities' between the PE and CE nodes. Alternatively, the CE and PE nodes may use [BGP-MD5] on the [BGP-4] session to authenticate the prefixes and the associated "Security Gateway Identity".

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a first node of a physical network supporting multiple virtual network connections, a method to dynamically modify configuration data supporting virtual networks, the method comprising:
receiving i) destination network address information associated with at least one host computer, and ii) a corresponding gateway identifier of a gateway in the physical network, the gateway being an ingress edge node of the physical network through which the at least one host computer communicates;
generating a notification message including the destination network address information and the corresponding gateway identifier; and
transmitting the notification message to a second node of the physical network enabling the second node to create a mapping between the at least one host computer and a virtual network connection between the second node and the first node on which to forward data messages from the second node through the gateway to the at least one host computer based on identifying, as specified by the mapping, that the data messages having the destination network address information are to be mapped to and sent over the virtual network connection to the at least one host computer through the gateway as specified by the corresponding gateway identifier.

2. A method as in claim 1, wherein generating a notification message further comprises:
generating at least a portion of the notification message in accordance with a distribution protocol utilized by service providers to disseminate routing policy information to customer edge nodes; and
wherein transmitting a notification message includes:
transmitting the destination network address information and the corresponding gateway identifier as an appendix to the notification message.

3. A method as in claim 2, wherein the distribution protocol is based at least in part on an interautonomous system routing protocol and the virtual network connection between the second node and the first node is a virtual private network connection overlaid on the physical network, one end of the virtual private network connection terminating at the gateway identified by the corresponding gateway identifier.

4. A method as in claim 1 further comprising:
transmitting routing policy attribute information in addition to the destination network address information and corresponding gateway identifier to the second node to more particularly define a policy for routing the data messages on a corresponding virtual network connection through the gateway to the at least one host computer.

5. A method as in claim 1, wherein the first and the second nodes are part of a network that does not inherently support encryption services and configuration data at the second node at least partially supports encryption of data messages forwarded to the at least one host computer through the gateway identified by the corresponding gateway identifier.

6. A method as in claim 1, wherein transmitting the network address and identifier includes:
delivering the notification message including the network address and corresponding gateway identifier to multiple customer edge nodes of the physical network, each customer edge node updating its corresponding configuration data for establishing private networks between the customer edge nodes based on the network address and corresponding gateway identifier.

7. A method as in claim 1, wherein the first and second nodes are customer edge nodes in a network and the network supports virtual private networks terminating at the customer edge nodes.

8. A method as in claim 1, wherein the destination network address information identifies a single host computer.

9. A method as in claim 1, wherein the destination network address information identifies a range of host computers that are part of a network coupled to the first node.

10. A method as in claim 1, wherein the corresponding gateway identifier is an IPsec identity associated with the at least one host computer.

11. A method as in claim 1 further comprising:
generating a map at the second node based on the destination network address information and the corresponding gateway identifier of the gateway for routing of messages destined for the at least one host computer via the gateway identifier, the second node supporting forwarding of the messages to the at least one host computer through the gateway as specified by the corresponding gateway identifier.

12. A method as in claim 2, wherein transmitting the notification message to the second node includes:
transmitting the notification message from a first customer edge node through a path including a service provider network to a second customer edge node, the second customer edge node configured to utilize the destination network address information and the corresponding gateway identifier to create a map specifying the gateway in the physical network as specified by the corresponding gateway identifier on which to forward messages from the second customer edge node through the service provider network to the first customer edge node to the at least one host computer.

13. A method as in claim 12, wherein transmitting the notification message from the first customer edge node through the path including the service provider network to the second customer edge node includes:
transmitting the notification message to a first service provider edge router in the service provider network, the first service provider edge router configured to distribute the notification message to multiple other service provider edge routers in the service provider network.

14. A method as in claim 13, wherein each of the multiple other service provider edge routers in the service provider network is configured to identify which virtual private network the corresponding gateway identifier is associated with for purposes of advertising the destination network address information and the corresponding gateway identifier to appropriate customer edge nodes, a given provider edge router of the other service provider edge routers configured to receive the notification message from the first service provider edge router and forward the destination network address information and the corresponding gateway identifier to the second customer edge router.

15. A method as in claim 14, wherein the given service provider edge router is configured to determine a virtual private network to which the notification message pertains based on use of a route target extended community attribute.

16. A method as in claim 12 further comprising:
maintaining at least one encryption key in the map to enable the second customer edge node to identify how to encrypt information transmitted to the at least one host computer.

17. A computer system at a first node of a physical network that at least partially supports a virtual network connection, the computer system comprising:
a processor;
a memory unit that stores instructions associated with an application executed by the processor;
a communication interface that supports communication with other nodes of the physical network; and
an interconnect coupling the processor, the memory unit, and the communication interface, enabling the computer system to execute the application and perform operations of:
receiving i) destination network address information associated with at least one host computer, and ii) a corresponding gateway identifier of a gateway in the physical network;
generating a notification message including the destination network address information and the corresponding gateway identifier; and
transmitting the notification message including the destination network address information and the corresponding gateway identifier to a second node of the physical network enabling the second node to establish a virtual network connection between the second node and the first node on which to forward data messages to the at least one host computer based on the corresponding gateway identifier.

18. A computer system as in claim 17 that, when generating a notification message and respectively transmitting a notification message, further performs operations of:
generating at least a portion of the notification message in accordance with a distribution protocol utilized by service providers to disseminate routing policy information to customer edge nodes; and
transmitting the destination network address information and the corresponding gateway identifier as an appendix to the notification message.

19. A computer system as in claim 18, wherein the distribution protocol is based at least in part on an interautonomous system routing protocol and the virtual network connection between the second node and the first node is a virtual private network connection overlaid on the physical network, one end of the virtual private network connection terminating at the gateway identified by the corresponding gateway identifier.

20. A computer system as in claim 17 that further performs an operation of:
transmitting routing policy attribute information in addition to the destination network address information and corresponding gateway identifier to the second node to more particularly define a policy for routing the data messages on a corresponding virtual network connection through the gateway to the at least one host computer.

21. A computer system as in claim 17, wherein the first and the second nodes are part of a network that does not inherently support encryption services and configuration data at the second node at least partially supports encryption of data messages forwarded to at least one host computer through the gateway identified by the corresponding gateway identifier.

22. A computer system as in claim 17 that, when transmitting the network address and identifier, further performs operations of:
delivering the notification message including the network address and corresponding gateway identifier to multiple customer edge nodes of the physical network, each customer edge node updating its corresponding configuration data for establishing private networks between the customer edge nodes based on the network address and corresponding gateway identifier.

23. A computer system as in claim 17, wherein the first and second nodes are customer edge nodes in a network configured according to Request For Comment 2547 and the network supports virtual private networks terminating at the customer edge nodes.

24. A computer system as in claim 17, wherein the destination network address information identifies a single host computer configured to receive data messages transmitted over the virtual network connection and through the first node from the second node.

25. A computer system as in claim 17, wherein the destination network address information identifies a range of host computers that are part of a network coupled to the first node.

26. A computer system as in claim 17, wherein the corresponding gateway identifier is a network address of the at least one host computer.

27. In a receiving node of a physical network supporting multiple virtual network connections, a method to dynamically modify configuration data associated with at least one of the multiple virtual network connections, the method comprising:
receiving a notification message from a sending node of the physical network, the notification message including destination network address information and a corresponding gateway identifier of a gateway of the physical network;
based on contents of the notification message, modifying a map at the receiving node to include the destination network address information, the corresponding gateway identifier, and configuration data identifying at least part of a virtual network connection between the receiving node and the sending node on which to forward data messages through the gateway to a destination node as specified by the destination network address information; and
upon forwarding data messages through the receiving node, utilizing the map to identify on which virtual network to forward the data messages from the receiving node through the gateway to the destination node based on the destination network address information associated with the destination node to which the data messages are directed.

28. A method as in claim 27 further comprising:
at the receiving node including the map, receiving a data message to be forwarded based on a corresponding destination address;
comparing the destination address and a source address of the data message to destination network address information stored in the map;
identifying, based on the destination address, how to transmit the data message to the destination node based on a corresponding virtual network connection specified in the map.

29. A method as in claim 28 further comprising:
in response to identifying that the destination address of the data message matches destination network address information in the map, establishing the corresponding virtual network connection specified in the map on which to transmit the data message to the destination node.

30. A method as in claim 29, wherein establishing a virtual network connection includes establishing a virtual private network connection between the receiving node and sending node based on IKE (Internet Key Exchange) protocol and Ipsec (Internet Protocol Security).

31. A method as in claim 28 further comprising:
in response to identifying that the destination address of the data message matches destination network address information in the map, identifying whether a corresponding virtual network connection specified in the map has been established and, if so, transmitting the data message on the established virtual network connection to the destination node.

32. A method as in claim 27, wherein the destination network address information identifies a single host computer.

33. A method as in claim 27, wherein the destination network address information identifies a range of host computers that are part of a network coupled to the first node.

34. A method as in claim 27, wherein the corresponding gateway identifier is an IPsec identity associated with the at least one host computer.

35. A method as in claim 27, wherein the gateway is located in the sending node.

36. A method as in claim 27 further comprising:
based on receiving multiple notification messages from the sending node:
maintaining the map at the receiving node to include destination network address information for a first destination host computer and a first corresponding virtual network connection on which to forward data destined for the first destination host computer through the sending node to the first destination host computer; and
maintaining the map at the receiving node to include destination network address information for a second destination host computer and a second corresponding virtual network connection on which to forward data destined for the second destination host computer through the sending node to the second destination host computer.

37. A method as in claim 36 further comprising:
receiving first data at the receiving node, the first data having a destination network address specifying the first destination host computer as a respective recipient to which the first data is directed;
utilizing the map to identify the first corresponding virtual network connection as a path on which to forward the first data to the first destination host computer from the receiving node over the first virtual network connection to the sending node for further transmission of the first data from the sending node to the first destination host computer;
receiving second data at the receiving node, the second data having a destination network address specifying the second destination host computer as a respective recipient to which the second data is directed; and
utilizing the map to identify the second corresponding virtual network connection as a path on which to forward the second data to the second destination host computer from the receiving node over the second virtual network connection to the sending node for further transmission of the second data from the sending node to the second destination host computer.

38. A method as in as in claim 37, wherein the receiving node is a first customer edge router and the sending node is a second customer edge router of a service provider network; and
wherein the first destination host computer and the second destination host computer reside external to the service provider network.

39. A computer system at a receiving node of a physical network that at least partially supports a virtual network connection, the computer system comprising:
a processor;
a memory unit that stores instructions associated with an application executed by the processor;
a communication interface that supports communication with other nodes of the physical network; and
an interconnect coupling the processor, the memory unit, and the communication interface, enabling the computer system to execute the application and perform operations of:
receiving a notification message from a sending node of the physical network, the notification message including destination network address information of a destination node and a corresponding gateway identifier of a gateway of the physical network;
based on contents of the notification message, modifying a map at the receiving node to include the destination network address information, the corresponding gateway identifier, and configuration data identifying at least part of a virtual network connection between the receiving node and the sending node on which to forward data messages through the gateway to the destination node as specified by the destination network address information; and
utilizing the map to identify on which of multiple virtual network connections to forward the data messages from the receiving node through the gateway to the destination node based on the destination network address information associated with the destination node to which the data messages are directed to support forwarding of data messages through the receiving node.

40. A computer system as in claim 39 that further performs operations of:
at the receiving node including the map, receiving a data message to be forwarded based on a corresponding destination address;
comparing the destination address and a source address of the data message to destination network address information stored in the map;
identifying, based on the destination address, how to transmit the data message to the destination node based on a corresponding virtual network connection specified in the map.

41. A computer system as in claim 40 that further performs operations of:
in response to identifying that the destination address of the data message matches destination network address information in the map, establishing the corresponding virtual network connection specified in the map on which to transmit the data message to the destination node.

42. A computer system as in claim 41, wherein establishing a virtual network connection includes establishing a virtual private network connection between the receiving node and sending node based on IKE (Internet Key Exchange) protocol and Ipsec (Internet Protocol Security).

43. A computer system as in claim 40 that further performs operations of:
in response to identifying that the destination address of the data message matches destination network address information in the map, identifying whether a corresponding virtual network connection specified in the map has been established and, if so, transmitting the data message on the established virtual network connection to the destination node.

44. A computer system as in claim 39, wherein the destination network address information identifies a single host computer.

45. A computer system as in claim 39, wherein the destination network address information identifies a range of host computers that are part of a network coupled to the first node.

46. A computer system as in claim 39, wherein the corresponding gateway identifier is a network address of the at least one host computer.

47. A computer system as in claim 39, wherein the gateway is located in the sending node.

48. A computer program product including a computer-readable medium having instructions stored thereon for processing data information, such that the instructions, when carried out by a processing device, enable the processing device to perform the steps of:
receiving i) destination network address information associated with at least one host computer, and ii) a corresponding gateway identifier of a gateway in the physical network;
generating a notification message including the destination network address information and the corresponding gateway identifier; and
transmitting the notification message to a second node of the physical network enabling the second node to establish a virtual network connection between the second node and the first node on which to forward data messages to the at least one host computer based on a mapping association, at the second node, between the destination network address information and the corresponding gateway identifier.

49. A computer system as in claim 39, wherein the virtual network connection between the receiving node and sending node is a first virtual network connection of the multiple virtual network connections on which to forward data from the receiving node through the sending node to the destination node;
wherein the destination node is a first destination host computer of multiple destination host computers to which the sending node serves as a pass-through node for forwarding data received from the receiving node;
wherein the notification message is a first notification message; and
wherein the corresponding gateway identifier is a first gateway identifier.

50. A computer system as in claim 49 further supporting operations of:
receiving a second notification message from the sending node of the physical network, the second notification message including destination network address information of a second destination node and a second gateway identifier of a second gateway of the physical network, the second destination node being a second destination host computer of the multiple destination host computers;
based on contents of the second notification message, modifying the map at the receiving node to include the second destination network address information, the second gateway identifier, and configuration data identifying at least part of a second virtual network connection between the receiving node and the sending node on which to forward data messages through the second gateway to the second destination node as specified by the second destination network address information; and
utilizing the map to select the second virtual network connection of the multiple virtual networks to forward a given received data message from the receiving node through the gateway to the second destination node based on identifying that the given received data message includes a destination network address equivalent to the second destination network address information in the map.

51. A computer system as in claim 50, wherein the receiving node is a first customer edge router and the sending node is a second customer edge router in a service provider network; and wherein the first destination host computer and the second destination host computer reside external to the service provider network.

52. A computer program product including a computer-readable medium having instructions stored thereon for processing data information, such that the instructions, when carried out by a processing device, enable the processing device to perform the steps of:
receiving a notification message from a sending node of the physical network, the notification message including destination network address information and a corresponding gateway identifier of a gateway of the physical network;
based on contents of the notification message, modifying a map at the receiving node to include the destination network address information, the corresponding gateway identifier, and configuration data identifying at least part of a virtual network connection between the receiving node and the sending node on which to forward data messages through the gateway to a destination node as specified by the destination network address information; and
utilizing the map to identify on which virtual network to forward the data messages through the gateway to the destination node based on the destination network address information associated with the destination node to which the data messages are directed to support forwarding of data messages through the receiving node.

53. A computer system at a receiving node of a physical network that at least partially supports a virtual network connection, the computer system comprising:
means for receiving a notification message from a sending node of the physical network, the notification message including destination network address information and a corresponding gateway identifier of a gateway of the physical network; and
means for modifying a map at the receiving node to include the destination network address information, the corresponding gateway identifier, and configuration data identifying at least part of a virtual network connection between the receiving node and the sending node on which to forward data messages through the gateway to a destination node as specified by the destination network address information; and means for utilizing the map to identify on which virtual network to forward the data messages from the receiving node through the gateway to the destination node based on the destination network address information associated with the destination node to which the data messages are directed to support forwarding of data messages through the receiving node.

54. In a physical network supporting virtual private network connections terminating at customer edge routers coupled to a service provider network, a method comprising:

at a first customer edge router:

receiving a range of destination network addresses associated with host computers coupled to the first customer edge router;

in addition to receiving the range of destination network addresses, receiving a security gateway identifier associated with a second customer edge router of the service provider network;

generating and transmitting a notification message including the range of destination network addresses and the security gateway identifier to the second customer edge router; and at the second customer edge router:

receiving the notification message;

based on contents of the notification message, generating a map to include the range of destination network addresses and a corresponding virtual private network connection between the second customer edge router and first customer edge router; and prior to forwarding data messages through the second customer edge router to a computer having a destination network address in the range of destination network addresses, utilizing the map to identify on which virtual private network to forward the data messages.

* * * * *